United States Patent
De Carranza

[15] 3,684,790
[45] Aug. 15, 1972

[54] METHOD OF SEPARATING PROTEINS FROM PROTEINACEOUS ANIMAL MATERIAL USING MUCILAGE OF FLAX, QUINCE OR FLEAWORT

[72] Inventor: Elma Paniaga De Carranza, Jr. Arica 242 Magdalena Nueva, Lima, Peru

[22] Filed: July 23, 1970

[21] Appl. No.: 58,650

[52] U.S. Cl............260/112 R, 99/18.21, 260/123.5
[51] Int. Cl................................................A23j 1/04
[58] Field of Search................260/112, 112 B, 123.5

[56] References Cited

UNITED STATES PATENTS

| | | | |
|---|---|---|---|
| 2,010,880 | 8/1935 | Near et al. | 260/123.5 X |
| 2,593,528 | 4/1952 | Bolley et al. | 260/123.5 X |
| 2,573,072 | 10/1951 | Vassel | 260/123.5 |

OTHER PUBLICATIONS

Chem. Abstracts, Vol. 32, 5485, 6– 8, 1938, Marrack et al.

Primary Examiner—Howard E. Schain
Attorney—Kurt Kelman

[57] ABSTRACT

Protein is precipitated in clots from proteinaceous animal material by subjecting the same to the action of the mucilage of flax, quince or fleawort seeds. The residual liquid mass contains amino acids, vitamins, hormones and salts which may be separated by conventional methods.

11 Claims, No Drawings

METHOD OF SEPARATING PROTEINS FROM PROTEINACEOUS ANIMAL MATERIAL USING MUCILAGE OF FLAX, QUINCE OR FLEAWORT

The present invention relates to improvements in the separation of proteins from proteinaceous animal materials. The animal materials may be derived from land and/or aquatic animals, such as fish and crustaceae, as well as their parts and by-products, including animal blood, meat, milk and glue, for instance. The separated protein solid may be ground or otherwise comminuted to obtain such products as fish meal, meal of blood and milk powder.

In the method of this invention, the animal material is subjected to coagulation until proteinaceous clots are formed and the clots are separated by any suitable method from the residual liquid mass which may contain amino acids, vitamins, hormones and organic and mineral salts, as well as polypeptides, whereby the proteins and the other components of the animal material are selectively separated.

According to the invention, the coagulating agent with which the animal material is treated is a mucilage of plant seeds selected from flax (*Decotum seminis Lini*), quince (*Cydonia oblonga*) of the family of Rosaceae, and fleawort (*Plantago psyllium*) of the family of Plantaginaceae, or a mixture of such mucilages. I have found that these mucilages consist of substantially the same chemical components and act identically as efficient coagulating agents in the selective separation process of the present invention.

On being hydrolyzed, each of these mucilages produces structurally very similar compounds, such as L-arabinose, aldobionic acids including gluco-beta-glycuronic acid, D-galacturonic acid, D-xylose, D-galactose, and others.

The animal material may be raw or cooked, or enzymatically hydrolyzed when subjected to coagulation. Whole animals or their pieces may be used, and the material may be comminuted by grinding and the like. It may consist of the meat of an animal with or without the admixture of fluid blood and/or other by-products.

The term "mucilage" also includes derivatives thereof, such as their esters.

The coagulating treatment may be effected in an acidic, neutral or basic medium. Normally, no adjustment of the pH is required to obtain proteinaceous clots but when it is desired to co-precipitate the polypeptides and thus to separate them together with the proteins from the residual liquor, it is necessary to proceed at the isoelectric point of pH 4.5 of the animal material.

The solid precipitate may be readily separated by any conventional separation method, including filtration, decanting, centrifuging, flotation, vibration, etc. After the proteinaceous clots, which may contain polypeptides if the animal material has been treated at its isoelectric point, has been removed, there remains a residual liquor without any solids in suspension. This liquor contains such components as amino acids, hormones, vitamins and mineral salts which may be recovered from the liquor by well known separation methods.

I have found that the specific coagulating agents mentioned hereinabove make it possible very effectively to flocculate proteinaceous animal materials with a minimum amount of mucilage, the described mucilages having the additional advantage of being non-toxic so that they do not interfere with the alimentary quality of the resultant products. Furthermore, the coagulating process is exceedingly simple and selective separation is obtained without the use of complicated and expensive equipment.

In this process, all colloidally suspended solids are separated by coagulation, leaving a residual liquid mass free of proteins and containing only oil and such soluble substances as amino acids, hormones, vitamins, mineral salts and, depending on the pH of operation soluble polypeptides. Thus, no aqueous suspension of protein is formed, which I term "aqueous glue."

Since the protein coagulation method of the present invention is applicable also to the blood and other proteinaceous waste products of land animals, it makes it possible to recover their proteins for nutritional purposes while eliminating them from the waste drainage in slaughter houses.

When fish is used as the animal starting material, I prefer to work with fluid fish blood. In this case, the resultant proteinaceous clots may be filtered from the residual liquid mass, and salts remaining in the clots may be washed and thus removed therefrom. It is preferred to heat the fish to a high temperature and, if the maximum amount of oil is to be recovered from the residual liquor, the fish must be finely ground before it is subjected to the coagulating treatment. The mucilage may be added at any stage of the treatment, i.e., before or after the animal material has been heated. No adjustment of the pH is required, as mentioned hereinabove, unless it is desired to precipitate the polypeptides with the protein, in which case it is necessary to work at the isoelectric point of pH 4.5. As soon as the mucilage is brought into intimate contact with the proteins, large clots of coagulated protein will form instantaneously. When the process is applied to enzymatically hydrolyzed animal materials, the residual proteins therein will be separated therefrom by coagulation with the mucilage hereinabove described, leaving the hydrolyzed product in solution.

The following specific examples illustrate the practice of the present invention without limiting the scope thereof.

EXAMPLE 1

250 cc of mucilage of fleawort (*Plantago psyllium*) seed were added to 2.5 kg of boiled and ground fish at boiling temperature. After agitation, coagulation occurred and the protein precipitate was separated by filtration or centrifuging. The residual liquid contained oil and no solid in suspension. The oil was separated from the residual liquid to obtain a completely transparent liquid.

The transparent liquid contained amino acids, hormones, vitamins and salts, which could be separated by conventional methods, if desired. Also, if the original mixture was adjusted to the isoelectric point, i.e., a pH of 4.5, at the time of coagulation, polypeptides may be recovered with the protein precipitate.

EXAMPLE 2

250 cc of mucilage of quince (*Cydonia oblonga*) seed were added to 2.5 l of tail water. On agitation, clots formed in the liquid mixture which were readily separated. The residual liquid contained minimal quantities of oil as well as amino acids, vitamins and salts. The latter would again be separated by conventional methods, as and if desired.

EXAMPLE 3

Five liters of a mixture of the mucilages of the seeds of fleawort, quince and flax were added to 50 kg of ground and cooked fish. The mixture was agitated for a short time until easily separable clots were formed. Upon separation of the precipitated clots, there remained a liquid containing oil. After separation of the oil, the residual clear liquid contained amino acids, salts, vitamins and polypeptides. The polypeptides were separated by precipitation on adding an acid, by filtration or by centrifuging.

EXAMPLE 4

200 kg of cooked fish were mixed with 20 l of fluid fish blood, and the mixture was heated until all the fluid blood was precipitated. Twenty liters of flax seed mucilage was then added to obtain large clots. The coagulated clots were separated to leave an oily residual liquid containing amino acids, vitamins and mineral salts.

The same result was obtained when the mucilage was added to the fish while it was being cooked.

EXAMPLE 5

Five liters of cow blood were agitated to break up clots therein and, while being boiled, 500 cc of fleawort seed mucilage was added. Clots coagulated from the boiled liquid and, upon separation of the clots, a clear liquid remained which contained vitamins, amino acids and mineral salts.

The same results were obtained by using the blood of horses, dogs, cats, rodents and other available land animals.

EXAMPLE 6

Nine kilograms of fish were mixed with one liter of fish blood and the mixture was ground and cooked. During cooking, mucilage of quince seed was added to precipitate protein clots. The pH was held on the acid side to prevent the coagulation of polypeptides so that the residual liquid contained free amino acids, mineral salts and vitamins.

EXAMPLE 7

Twenty kilograms of fish scrap (heads, intestines, bones, tails, etc.) or the same amount of waste from lobsters and/or shrimps were ground and cooked. Mucilage of flax seed was added to the mass during cooking to obtain protein clots which were separated to leave an oily residual liquid containing similar components as in the residual liquid of Example 6.

EXAMPLE 8

Example 7 was repeated with ground fish filet, one liter of mucilage being added per kilogram of fish filet. The results were identical.

In all of the examples, it was found that the mucilages of quince, fleawort and flax seed were completely interchangeable.

While the present invention has been illustrated hereinabove in connection with certain specific examples and embodiments, it will be clearly understood that it is applicable to the treatment of any proteinaceous animal material, which includes aquatic and land animals, such as fish and crustaceae, as well as their parts and by-products, such as animal blood or glue, to precipitate the protein and, if desired, polypeptide solids in a coagulation step, leaving a residual oily liquid containing amino acids, vitamins, mineral salts and, depending on the pH during coagulation, polypeptides. The separated protein precipitate may then be ground into meal, if desired, and the components of the residual liquid may be separated in any conventional manner, the separation procedures being well known in this art. The scope of this invention is accordingly defined by the appended claims.

I claim:

1. A method of separating proteins from fish or crustaceae animal materials, which comprises grinding and cooking whole fish or crustaceae, adding a mucilage coagulating agent of plant seeds selected from the group consisting of flax (*Decotum seminis Lini*), quince (*Cydonia oblonga*) of the family Rosaceae, and fleawort (*Plantago psyllium*) of the family of Plantaginaceae to the ground and cooked fish or crustaceae, said coagulating agent being added in an amount sufficient to form proteinaceous clots, and separating the proteinaceous clots from the residual liquid mass.

2. The method of claim 1 wherein a mixture of the mucilages of at least two of said plant seeds is mixed with the animal material.

3. The method of claim 1 wherein the mucilage is mixed with the animal material at a neutral pH.

4. The method of claim 1 wherein the mucilage is mixed with the animal material at an acidic pH.

5. The method of claim 1 wherein the mucilage is mixed with the animal material at a basic pH.

6. The method of claim 1 wherein the mucilage is mixed with the animal material at a pH other than the isoelectric point of the animal material, and the clots consist essentially of protein.

7. The method of claim 6, wherein the residual liquid mass contains polypeptides.

8. The method of claim 1 wherein the mucilage is mixed with the animal material at the isoelectric point of the animal material, and the clots contain polypeptides.

9. The method of claim 1 wherein the coagulating action takes place at ambient temperature.

10. The method of claim 1 wherein the animal material is fish and is heated while being subjected to the coagulation.

11. The method of claim 1 wherein at least 5 percent, by weight, based on the proteinaceous animal material, of the mucilage is added to said material.

* * * * *